United States Patent
Pradier

(10) Patent No.: US 9,804,653 B2
(45) Date of Patent: Oct. 31, 2017

(54) ELECTRICAL DISTRIBUTION SYSTEM FOR AN AIRCRAFT

(71) Applicant: Zodiac Aero Electric, Montreuil (FR)

(72) Inventor: Jean-Clair Pradier, Houilles (FR)

(73) Assignee: Zodiac Aero Electric, Montreuil (FR)

(*) Notice: Subject to any disclaimer, the term of this patent is extended or adjusted under 35 U.S.C. 154(b) by 259 days.

(21) Appl. No.: 14/826,741

(22) Filed: Aug. 14, 2015

(65) Prior Publication Data
US 2016/0048186 A1 Feb. 18, 2016

(30) Foreign Application Priority Data
Aug. 14, 2014 (FR) ..................... 14 57844

(51) Int. Cl.
*G06F 11/00* (2006.01)
*G06F 1/28* (2006.01)
(Continued)

(52) U.S. Cl.
CPC .............. *G06F 1/28* (2013.01); *G06F 13/36* (2013.01); *H02J 1/00* (2013.01); *H02J 4/00* (2013.01); *H02J 9/00* (2013.01); *H02J 13/00* (2013.01)

(58) Field of Classification Search
CPC .......... H02H 3/05; H02H 1/0092; H02H 3/00; H02H 7/261; H02J 3/005; H02J 3/006;
(Continued)

(56) References Cited

U.S. PATENT DOCUMENTS

| 4,598,890 A * | 7/1986 | Herzog ................. B64C 13/503 244/223 |
| 5,752,047 A * | 5/1998 | Darty ........................ G06F 1/26 361/2 |

(Continued)

FOREIGN PATENT DOCUMENTS

| EP | 1 840 688 A2 | 10/2007 |
| EP | 1 967 929 A2 | 9/2008 |

(Continued)

OTHER PUBLICATIONS

Enthoven, J.H., et al., "Software Design for the Fault Tolerant Electrical Power System," Proceedings of the IEEE National Aerospace and Electronics Conference (NAECON), Dayton, Ohio, May 18-22, 1987, vol. 4, pp. 1475-1482.

(Continued)

*Primary Examiner* — Loan L. T. Truong
(74) *Attorney, Agent, or Firm* — Christensen O'Connor Johnson Kindness PLLC

(57) ABSTRACT

Electrical distribution system for an aircraft comprising at least one electrical supply path comprising at least one power unit capable of opening or closing the connection between at least one electrical energy source and at least one device of the aircraft. The system comprises protection cards (2b, 2n) each comprising at least two microcontrollers each capable of sending a command to each power unit of the electrical supply paths protected by each protection card and, among the set of microcontrollers of the protection cards, at least two microcontrollers are provided with a communication and computation function with all of the microcontrollers of the protection cards (2b, 2n).

10 Claims, 6 Drawing Sheets

(51) Int. Cl.
*G06F 13/36* (2006.01)
*H02J 1/00* (2006.01)
*H02J 4/00* (2006.01)
*H02J 9/00* (2006.01)
*H02J 13/00* (2006.01)

(58) Field of Classification Search
CPC . H05K 7/1457; G06F 11/182; G06F 11/2015; G06F 3/0658; B64D 2221/00
See application file for complete search history.

(56) References Cited

U.S. PATENT DOCUMENTS

| | | | | |
|---|---|---|---|---|
| 5,835,322 A * | 11/1998 | Smith | ................... | H02H 3/33 361/45 |
| 6,504,730 B1 * | 1/2003 | Cooney | ............... | H05K 7/1457 174/50 |
| 7,313,665 B2 * | 12/2007 | Kudelski | .............. | G06Q 20/341 235/492 |
| 7,752,385 B2 * | 7/2010 | Elliott | ................... | G06F 3/0607 711/112 |
| 9,025,950 B2 * | 5/2015 | Wakaki | ................ | H04B 10/801 398/1 |
| 9,092,029 B2 * | 7/2015 | Poisson | .............. | G05B 23/0213 |
| 9,460,046 B1 * | 10/2016 | Hudson | ................ | G06F 15/161 |
| 2002/0108065 A1 | 8/2002 | Mares | | |
| 2003/0002505 A1 * | 1/2003 | Hoch | ................... | H04J 3/1611 370/392 |
| 2004/0030773 A1 * | 2/2004 | Espinoza-Ibarra | ... | G06F 1/3203 709/224 |
| 2004/0078620 A1 * | 4/2004 | Harel | ................. | G06F 11/2005 714/4.11 |
| 2006/0200688 A1 * | 9/2006 | Tofigh | ................. | H02H 1/0015 713/300 |
| 2007/0081284 A1 * | 4/2007 | McAvoy | ................. | H02H 3/04 361/62 |
| 2007/0157052 A1 * | 7/2007 | Sellars | ................ | G06F 11/2005 714/15 |
| 2009/0323704 A1 * | 12/2009 | Hall | ........................ | H04L 12/42 370/401 |
| 2010/0014531 A1 * | 1/2010 | Pirbhai | ................... | H04L 45/68 370/401 |
| 2010/0148791 A1 * | 6/2010 | Oldenburg | ........... | G01R 31/008 324/523 |
| 2010/0222900 A1 * | 9/2010 | Kakino | .................... | G05B 9/03 700/82 |
| 2010/0322618 A1 * | 12/2010 | Zheng | ....................... | H04J 3/14 398/2 |
| 2013/0039481 A1 * | 2/2013 | Garaschenko | .......... | H04M 3/24 379/102.04 |
| 2013/0111914 A1 * | 5/2013 | Kempinski | ............. | F02C 7/266 60/772 |
| 2013/0144447 A1 * | 6/2013 | Simper | ..................... | H02J 3/26 700/286 |
| 2014/0104734 A1 * | 4/2014 | Prisse | ...................... | H02H 3/14 361/79 |
| 2014/0333127 A1 * | 11/2014 | Edwards | ................. | B60R 16/03 307/9.1 |
| 2015/0019169 A1 * | 1/2015 | Cheng | .................... | G01M 15/02 702/183 |
| 2016/0049868 A1 * | 2/2016 | Pradier | ................... | H03K 17/18 307/9.1 |

FOREIGN PATENT DOCUMENTS

| | | |
|---|---|---|
| EP | 2 230 743 A2 | 9/2010 |
| EP | 2 442 425 A1 | 4/2012 |
| FR | 2 900 637 A1 | 11/2007 |

OTHER PUBLICATIONS

Preliminary Search Report, dated Apr. 17, 2015, issued in corresponding French Patent Application No. 1457844, filed Aug. 14, 2014, 2 pages.
UK Search Report, dated Feb. 1, 2016, issued in corresponding Application No. GB 1514131.0, filed Aug. 11, 2015, 2 pages.

* cited by examiner

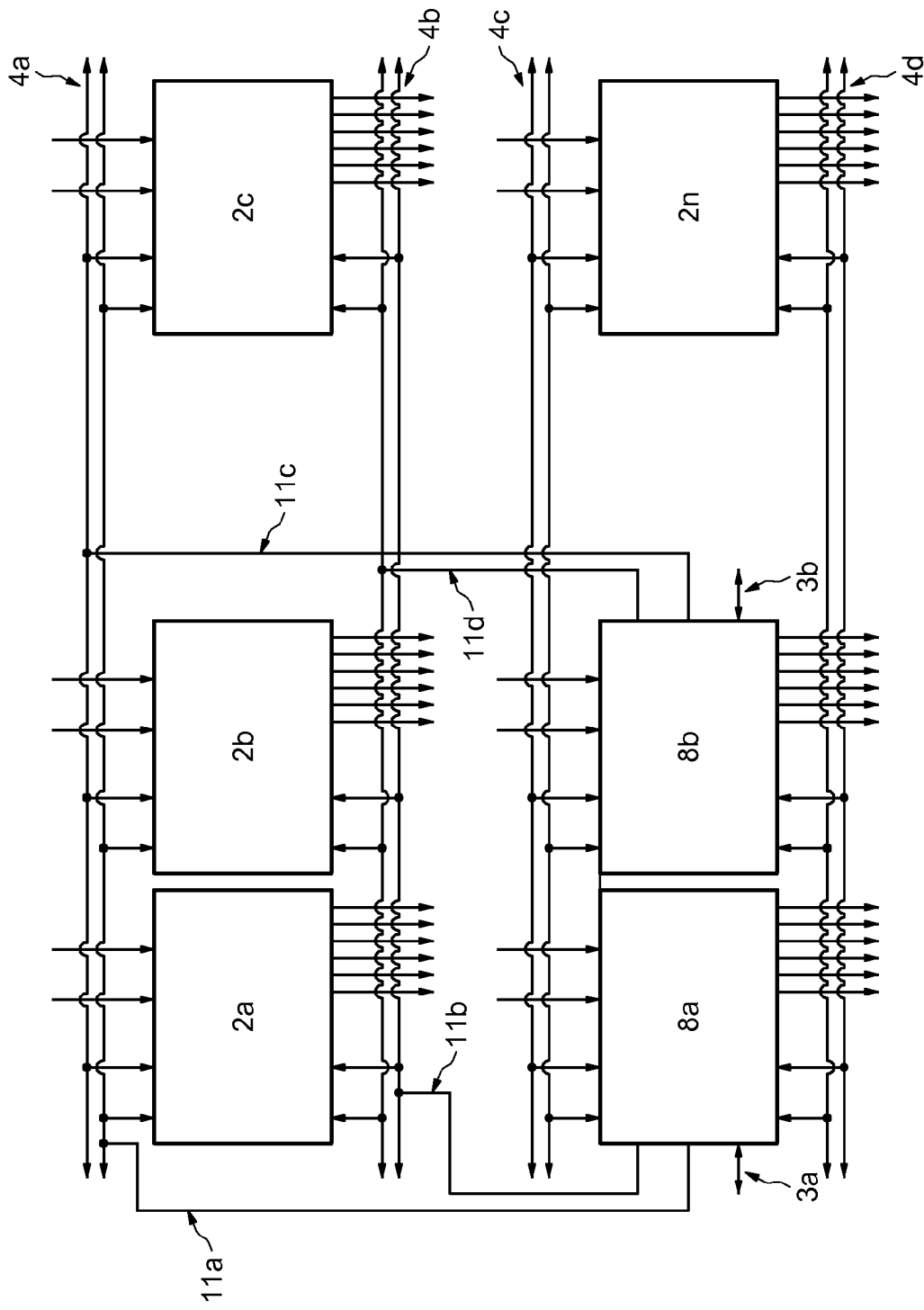

ELECTRICAL DISTRIBUTION SYSTEM FOR AN AIRCRAFT

The technical field of the invention is that of electrical distribution systems for aircraft, and more particularly the control of such systems.

An aircraft generally has an electrical system notably comprising a primary electrical energy distribution system and a secondary distribution system. This secondary distribution system makes it possible to protect and to distribute the electrical power coming from internal sources, for example generators or batteries, or from external sources such as ground power units.

The secondary distribution system is composed of several electronic cards, notably communication and computation cards (EDMU) and protection cards (SSPC).

FIG. 1 shows a secondary distribution system according to the prior art. The system comprises two types of cards, communication and computation cards, called EDMU (the acronym for "Electrical Distribution Management Unit") and referenced (1a, 1b), and protection cards, called SSPC (the acronym for "Solid State Power Controller") and referenced (2a, 2b, 2n).

The different cards can be installed in a single rack or they can be distributed in the aircraft in different physical sub-assemblies comprising at least one card.

The function of a communication and computation card is to determine the commands (open or closed) of the power switches integrated in the protection cards, also called power units, controlling the powering up of lines which carry electrical energy to the loads of the aircraft. The expression "loads of the aircraft" refers to electrical equipments consuming the electrical energy made available.

More precisely, the communication and computation card provides the functions of communication with the aircraft via an aircraft bus (3a, 3b), notably according to the ARINC 429, AFDX, CAN and Ethernet standards and protocols, as well as the functions of acquisition of discrete inputs, of computation of the commands of protected paths (power units) on the basis of discrete inputs and/or of data received on the aircraft bus, of communication with the protection cards via an internal bus (4a, 4b), notably of the CAN or RS485 type, and of programming the protection cards (rating, type of protection curve, fallback mode in the case of communication failure).

The acquisition means are disposed directly on the communication and computation card or they are located on a specific additional card, called EDIU (the acronym for "Electrical Distribution Inputs Unit").

Communication with the protection cards comprises the sending of commands to the power units of protected paths called SSPC paths and reading the states of the protection cards, notably the state of the units, current and voltage measurements or results of self-tests.

The commands of the protected paths are usually calculated by using a database centralized in each communication and computation card, which contains, for each output, the list of contributing inputs (discrete inputs or inputs via the aircraft bus) and the control logic in the form of a truth table for example.

In each cycle, the communication and computation card acquires all of the inputs likely to be used by the control logics, calculates each protected path command and sends it to the protection cards (2a, 2b, 2n) via the internal communication bus (4a, 4b).

The communication and computation card also supplies each protection card with the data necessary for the protection, notably the rating, the type of curve, the order of activation or not of the protection functions (for example: arc detection), the fallback mode, that is to say the state into which the protected path switches in the case of a total failure of the internal communication busses (open, closed or in the prior state for example).

These data are transmitted in particular modes (charging on the ground, when powering up for example) and are no longer taken into consideration in the rest of the description.

In order to ensure good availability of the secondary distribution function, the communication and computation card has redundancy. Each protection card is managed by default by a first communication and computation card 1a. In the case of a failure of the first communication and computation card 1a, the protection card automatically switches over to a second communication and computation card 1b.

The function of a protection card is to determine the occurrence of anomalies at the level of the power units and/or of the electrical supply lines. In such a case, a protection card commands the opening of the power units in order to prevent damaging the connected loads.

More precisely, the protection card ensures the functions of communication with the communication and computation cards via the internal bus (usually: CAN, RS485 . . . ), the reception of the commands of the power units of the protected paths, the sending of the states of the protection cards (state of the switches, currents, voltage, self-test results), the control of the power units of the protected paths, the protection of the protected paths (overvoltage, short-circuit, differential protection, arc . . . ) according to the specific needs of the aircraft and the acquisition of the internal parameters of the protected paths (state of the switches, currents, voltage, self-test results).

This architecture according to the prior art allows good separation of the calculation and protection functions, with good reliability and good availability.

The processors and memories used for the design of the communication and computation cards make it possible to host a complete database for an entire aircraft, whereas the processors used for the protection cards are smaller (one microprocessor per protected path). Each microprocessor is therefore used to its maximum potential.

However, this architecture has a certain number of disadvantages such as the necessity of dedicating a card to the computation of the commands. This increases the weight and the cost of the system and necessitates a specific reference, with additional development.

For example, on an aircraft of the "executive jet" type, the secondary distribution system comprises four racks, each one housing eight protection cards and two communication and computation cards.

These communication and computation cards therefore represent a complete design of the hardware environment and of the software environment, which doubles the cost of electronic development, plus an excess production cost equivalent to 20% of the production cost of all the cards required.

In the case of modification of the system, during development or during the service life of the aircraft, the two types of cards have to be modified and possibly upgraded by the aircraft manufacturer or by the operators, which each time doubles the design and logistic costs.

A purpose of the invention is an electrical distribution system for an aircraft comprising at least one electrical supply path comprising at least one power unit capable of opening or closing the connection between at least one electrical energy source and at least one device of the aircraft. The system comprises protection cards each comprising at least two microcontrollers each capable of sending a command to each power unit of the electrical supply paths protected by each protection card and, among the set of microcontrollers of the protection cards, at least two microcontrollers are provided with a communication and computation function with all of the microcontrollers of the protection cards.

The microcontrollers provided with a communication and computation function can be disposed on a same protection card, the microcontrollers provided with a communication and computation function each having an interface with an aircraft bus.

The microcontrollers provided with a communication and computation function can be disposed on different protection cards, the microcontrollers provided with a communication and computation function each having an interface with an aircraft bus.

The microcontrollers provided with a communication and computation function can be protection cards provided with a daughter board comprising the interfaces with the aircraft bus.

The system can comprise at least two slots capable of receiving a protection card, each slot comprising electrical supplies and data connections allowing the functioning of the card, the daughter board being integral with a protection card slot.

The daughter board can be connected and disposed in such a way that it is integral with a protection card.

The system can comprise least two slots capable of receiving a protection card, each slot comprising electrical supplies and data connections allowing the functioning of the card, the protection cards comprising microprocessors provided with a communication and computation function are protection cards conFIGUREd to have the communication and computation function when they are disposed in a predetermined protection card slot.

The microcontrollers provided with a communication and computation function can be disposed on a same protection card concentrating all of the information coming from the aircraft bus and from the discrete inputs of all the protection cards of the system, the microcontrollers being capable of calculating all the commands of the power units of the protection cards via the internal bus.

The microcontrollers of each protection card can receive information coming from the discrete inputs directly connected to each protection card, the microcontrollers being capable of determining and sending the commands of the power units as a function of the information coming from the discrete inputs read.

The microcontrollers of each protection card can receive information coming from the discrete inputs directly connected to each protection card, the microcontrollers being capable either of determining and sending the commands of the power units as a function of the information coming from the discrete inputs read, or of receiving commands calculated by at least one protection card comprising microcontrollers provided with a communication function.

DESCRIPTION OF THE DRAWINGS

Other purposes, features and advantages of the invention will become apparent on reading the following description, given solely by way of non-limiting example and with reference to the appended drawings in which:

FIG. 6 shows a distribution system comprising redundant EDMU functions and additional internal communication busses.

DETAILED DESCRIPTION

Figure 2:
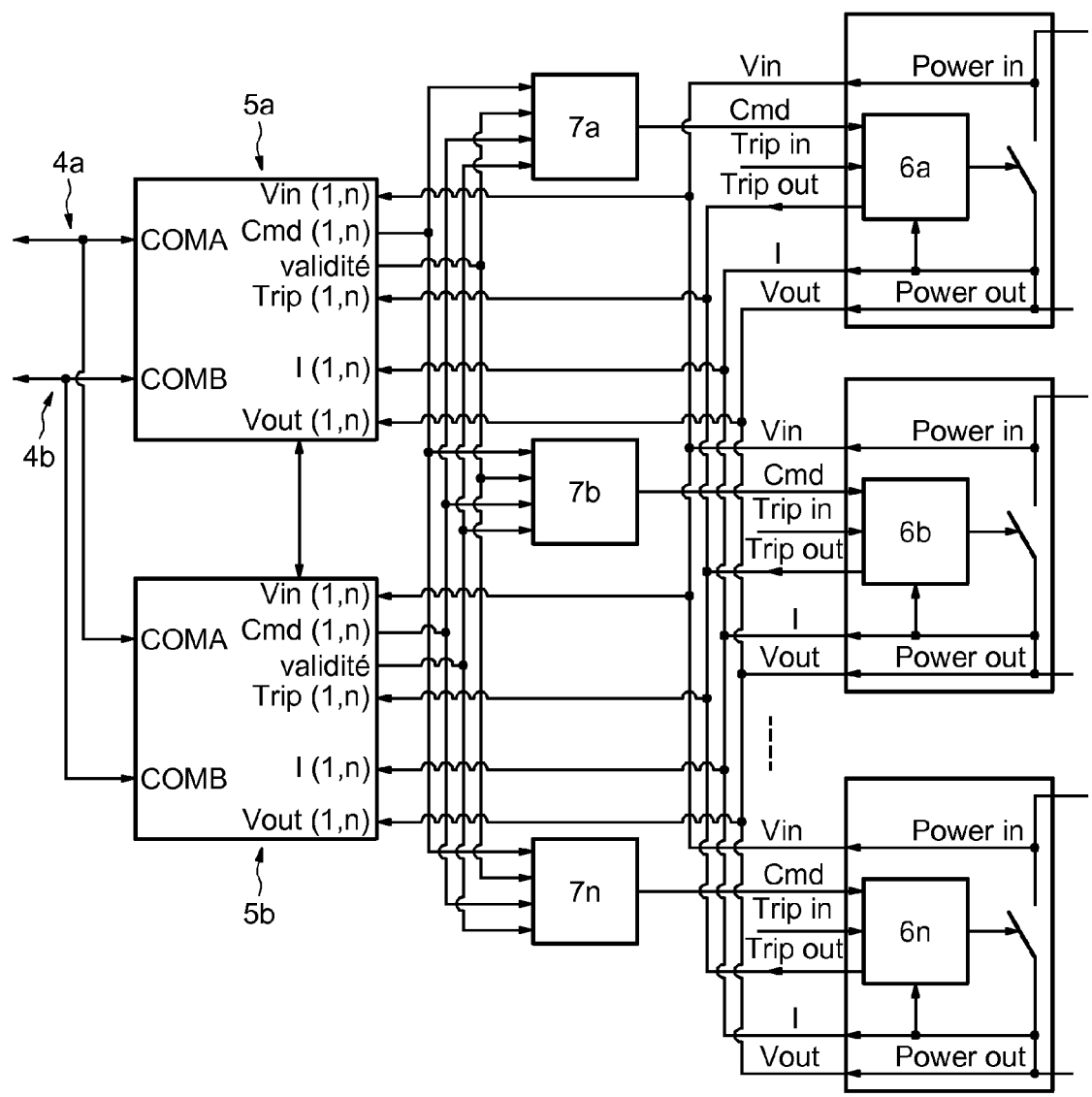
FIG. 2 shows the principal elements of a protection card having two microprocessors.

The current evolution in the structures of protection cards from now on makes it possible to envisage replacing the microprocessors utilised up to now unitarily for each protected path (that is to say, for example, 16 microprocessors for one 16 way protection card), by a set of at least two microprocessors used for controlling all of the paths. FIG. 2 shows the principal elements of such a protection card. It can be seen that two redundant microprocessors (5a, 5b) control the control devices (6a, 6b, 6n) of the power units of the protected paths by the intermediary of means of determining commands to be transmitted (7a, 7b, 7n) capable of determining which microprocessor command must be transmitted. The microprocessors are each connected to means of measuring the state of the protected path and to the aircraft busses (4a, 4b).

Such a protection card allows a substantial reduction of the umber of microprocessors used (with a saving of weight, volume and cost) and is made possible by the very substantial increase in the computing power of the most recent microprocessors.

It is possible by taking advantage of the present day capabilities of microprocessors, and by carrying out some modifications, to develop this architecture in order to integrate the EDMU functions or communication and computation functions of the electrical distribution system within a protection card. It is then possible to dispense with the presence of separate communication and computation cards.

Figure 1:
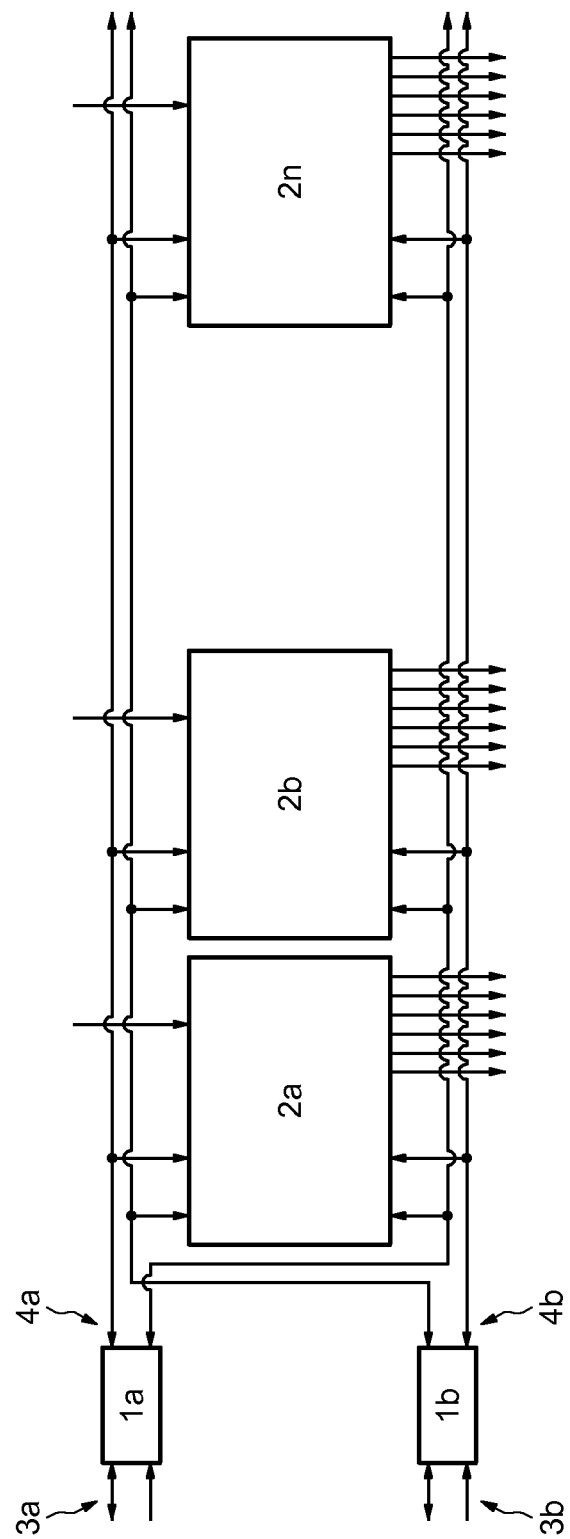
FIG. 1 shows a secondary distribution system according to the prior art.
Figure 3:
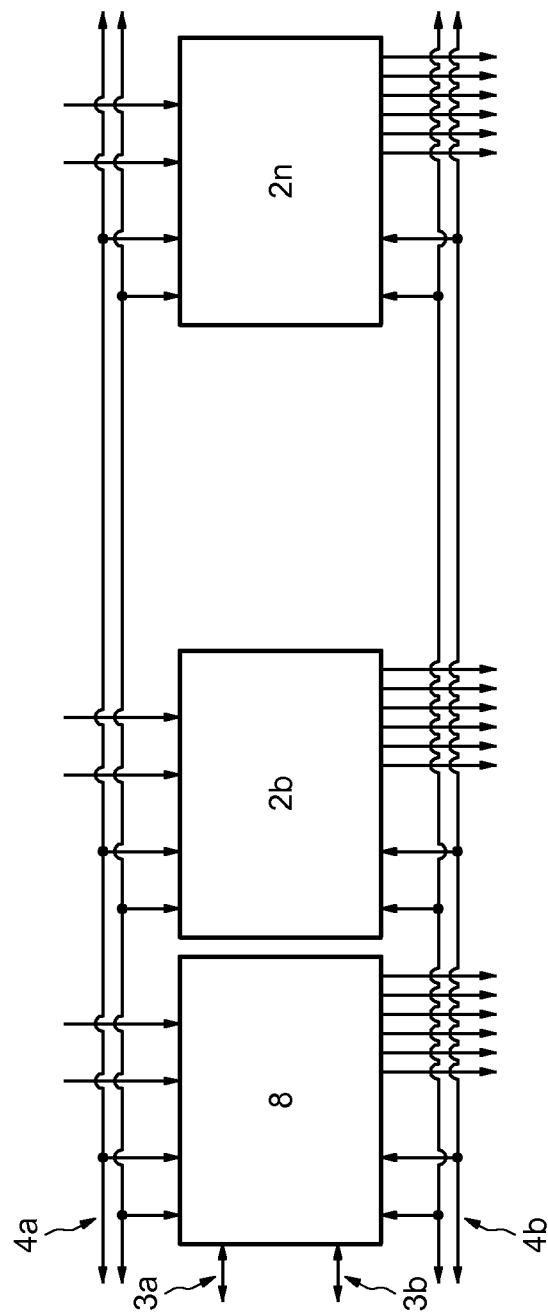
FIG. 3 shows a distribution system without a communication and computation card.

A distribution system without a communication and computation card is shown in FIG. 3. It can be seen that, unlike the architecture shown in FIG. 1, the communication and computation cards have been eliminated. Moreover, the aircraft busses (3a, 3b) are directly connected to a first protection card comprising the EDMU function, referenced 8, the first protection card comprising the EDMU function 8 being connected to the other protection cards (2b, 2n) by at least one internal bus (4a, 4b).

The two microprocessors of the protection card comprising the EDMU function are used, in order to provide availability equivalent to that of distribution systems using separate communication and computation cards.

Figure 4:
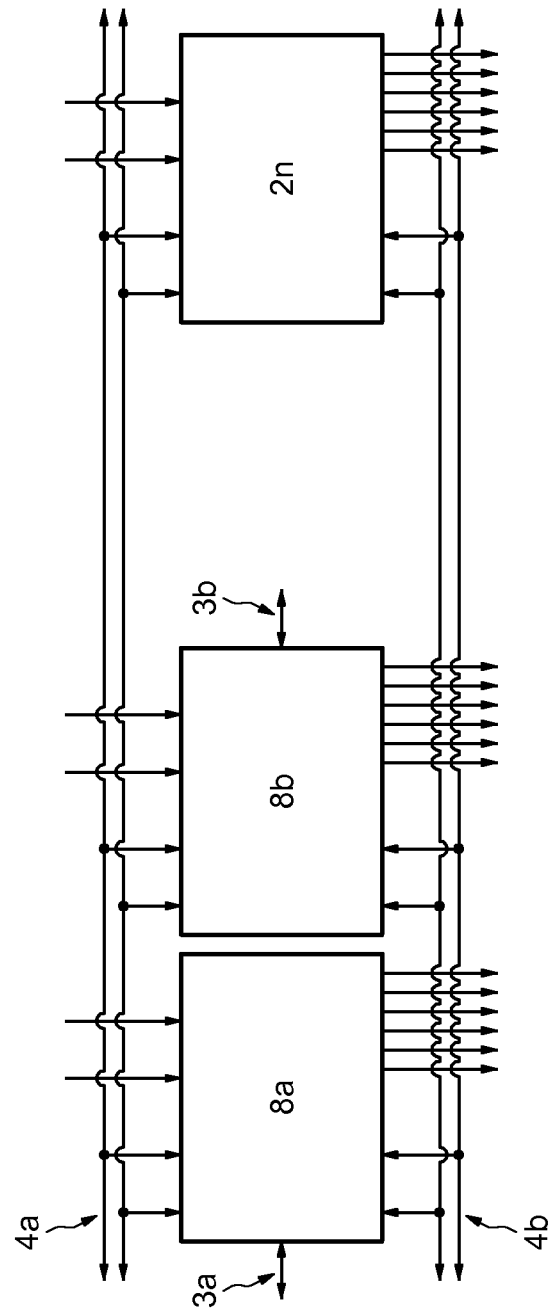
FIG. 4 shows a distribution system comprising redundant EDMU functions and the connection to the aircraft bus on two protection cards.

It is also possible to provide redundancy for the EDMU functions and the connection to the aircraft bus on two protection cards. FIG. 4 shows such an embodiment. It can be seen that, unlike the distribution system shown in FIG. 3, the present system comprises two protection cards comprising the EDMU function, referenced 8a and 8b, each connected to an aircraft bus, referenced 3a and 3b respectively. The two protection cards comprising the EDMU function are connected to the other protection cards (2b, 2n) by at least one internal bus (4a, 4b).

In this case, on each protection card comprising the EDMU function, only the processor onto which the aircraft bus is connected is used for the EDMU function.

This system has the advantage of carrying out the EDMU function on two physically separate cards, which eliminates any common point (connector, printed circuit, power supply) the failure of which could make the whole system unavailable.

Figure 5:
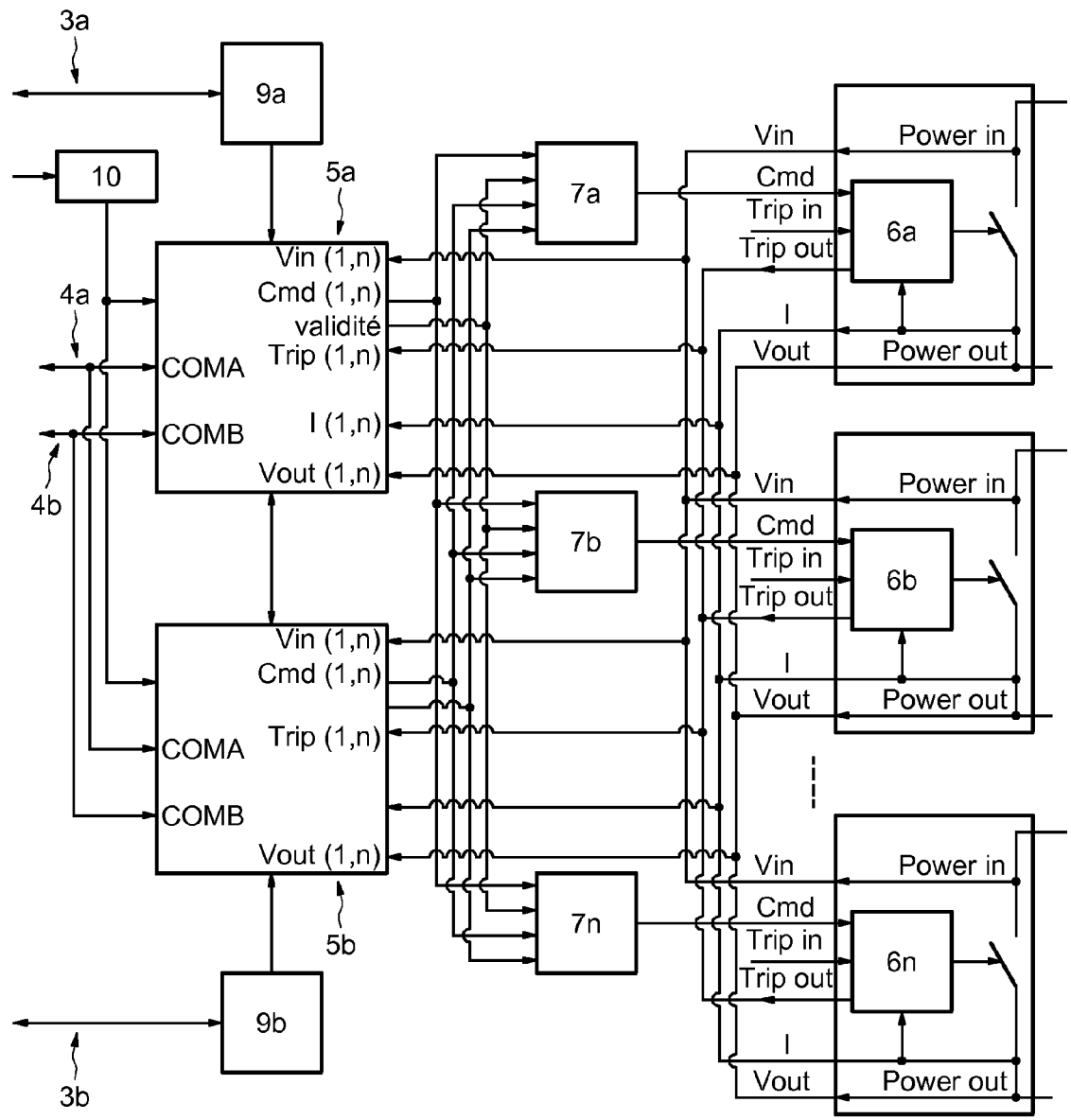
FIG. 5 shows the principal elements of a protection card integrating the EDMU function.

A protection card integrating the EDMU function is shown in FIG. 5. In comparison with FIG. 2, it can be seen that there has been added a first interface 9a of the first microprocessor 5a with an aircraft bus 3a and a second interface 9b of the second microprocessor 5b with another aircraft bus 3b.

In this case, all of the EDMU functions are transferred onto the protection card. This corresponds to the architecture of the system shown in FIG. 3.

Moreover, the protection cards dialog with the microprocessors of the protection card integrating the EDMU functions like they do with separate communication and computation cards. In other words, the protection cards dialog with the EDMU functions executed by the first processor 5a of the protection card integrating the EDMU functions, then with the second processor 5b of the protection card integrating the EDMU functions in the case of failure of the first processor 5a.

In the case where all of the EDMU functions are transferred onto two separate protection cards, there is added, in comparison to FIG. 2, a single interface 9 between one of the two microprocessors 5a, 5b and at least one of the aircraft busses 3a, 3b. Such a case is not shown. It corresponds however to the architecture of the system shown in FIG. 4.

The EDMU function is executed in each of the first microprocessors 5a of each protection card integrating the EDMU functions. The protection cards dialog with the first microprocessor of the first protection card integrating the EDMU functions then with the first processor of the second protection card integrating the EDMU functions in the case of failure of the first processor of the first protection card integrating the EDMU functions.

In all cases, there is also added a discrete input interface 10 to the microprocessors supporting the EDMU functions. Each protection card integrating the EDMU functions thus receives a portion of the discrete inputs (DSI) necessary for the system.

The interface 9a, 9b with the aircraft bus (3a, 3b), depending on its complexity and its cost, can be installed on all of the cards, whether they are protection cards (2a, 2b, 2n) or protection cards integrating the EDMU functions (8a, 8b). In this case, these cards are identical, the card or cards integrating the EDMU functions is determined by its position in the rack of cards. In other words, the protection cards integrating the EDMU functions (8a, 8b) are conFIGUREd by "pin-programming". The "pin-programming" corresponds to an identification and then a programming of the card when it is inserted in a predefined card slot. In the present case, the identification of the card or cards integrating the EDMU functions activates the EDMU functions present on the card. Only the protection card functions are activated for this same card if it does not have this identification. The card slot can de disposed on a mother board among other card slots.

This method is chosen in the case where the interface with the aircraft bus can be integrated in the microprocessor of the protection card at very low cost. This is the case when the bus is of the CAN or SCI type and is integrated in the microprocessor. This is also the case when the microprocessor has a double core making it possible to dedicate one core to the SSPC function and one core to the communication function (ARINC 429 emulation, software stack able to support the Ethernet protocol).

The interface 9a, 9b with the aircraft bus (3a, 3b), depending on its complexity and its cost, can be added onto one of the protection cards in the form of a daughter board. The protection card thus equipped assumes the EDMU function. The protection card integrating the EDMU functions is a standard protection card equipped with a communication module (factory fitted). It therefore has a dedicated reference. The protection card integrating the EDMU functions is recognized by the presence of the communication module and/or by pin-programming. The daughter board can be connected either directly to a protection card which thus assumes the EDMU function, or to a protection card slot, for example a card slot on a mother board, in such a way that a protection card inserted in this slot assumes the EDMU function. In this latter case, the mother board provides the connection of the signals between the daughter board and the protection card. These signals are the power supplies of the daughter board and the dialog signals between the communication function of the daughter board and the microcontroller of the protection card.

This system is chosen in the case where the interface with the aircraft bus represents a crippling cost for a systematic installation in all of the protection cards. This is the case, for example, when the bus is of the ARINC 429 type necessitating a dedicated and expensive circuit. This is also the case when the bus is of the AFDX type necessitating a dedicated and expensive circuit. In this case, it is a matter of a dedicated processor combining a DSP, an Ethernet interface and an AFDX software stack, the dedicated processor being combined with a dedicated avionic circuit.

The interface (9a, 9b) with the aircraft bus (3a, 3b), depending on its complexity and its cost, can be added (in mini-mezzanine style) on the mother board of the rack which houses the SSPC. All of the protection cards are therefore identical. The protection card integrating the EDMU functions is recognized by the presence of the communication module and/or by pin-programming.

This system is chosen in the case where the interface with the aircraft bus represents a crippling cost for a systematic installation in all of the protection cards. This is the case, for example, when the bus is of the ARINC 429 type necessitating a dedicated and expensive circuit. This is also the case when the mezzanine added to the rack must contain the minimum of components in order to be very compact and therefore contains only the communication circuit. The software management then remains provided by the microprocessor of the protection card.

The EDMU functions are therefore distributed over the set of protection cards as follows:

| | |
|---|---|
| Communication with the aircraft via an aircraft bus | Protection card with EDMU function |
| Acquisition of discrete inputs | From protection card to protection card with EDMU function |
| Communication with the protection cards via an internal bus | Between protection card and protection card with EDMU function |
| Calculation of commands from the discrete inputs and/or from the data received on the aircraft bus | Protection card or protection card with EDMU function |
| Sending of commands | Protection card with EDMU function |

| | |
|---|---|
| Reading the states of the protection cards | From protection card to protection card with EDMU function |
| Programming the protection cards | From protection card with EDMU function to protection card |

In the case of the calculation of the commands from the discrete inputs and/or from the data received on the aircraft bus and of sending the commands, two solutions can be envisaged.

In a first embodiment, the protection card integrating the EDMU functions concentrates all of the information, coming from the aircraft bus and from the discrete inputs of all the protection cards of the system, calculates all of the commands and sends them to the protection cards via the internal bus.

In a second embodiment, each protection card reads the information coming from the discrete inputs directly connected to each protection card, determines and sends the commands of the power units as a function of the information coming from the discrete inputs read.

In a third embodiment, each protection card reads the information coming from discrete inputs directly connected to each protection card. Each card can either determine the commands of the power units as a function of the information coming from the discrete inputs read or receive commands calculated by at least one protection card provided with the EDMU function.

Moreover, the protection card integrating the EDMU functions manages at least one internal communication bus (4a, 4b).

The internal communication bus (4a, 4b) comprises a minor cycle and a major cycle.

During each minor cycle, the protection card integrating the EDMU functions sends the command for a given protection card and in return receives the information relating to the said card.

A major cycle is completed at the end of (n−1) minor cycles, where n represents the number of protection cards connected to the internal bus.

At the end of the major cycle, the protection card integrating the EDMU functions calculates all of the commands for the next cycle.

The sequence is as follows for an internal bus of the CAN type having a data rate of 500 Kbits/s and comprising eight protection cards, that is to say one protection card integrating the EDMU functions and seven standard protection cards.

Each minor cycle lasts for 3 ms. The major cycle lasts for 21 ms.

The sending of a message lasts for 0.3 ms.

The sending of the command from the protection card integrating the EDMU functions to a protection card necessitates a CAN message, that is to say 0.3 ms.

The sending of the return data from a protection card to the protection card integrating the EDMU functions necessitates four CAN messages CAN, that is to say 1.2 ms.

The dialog is repeated seven times, since the protection card integrating the EDMU functions des not need to dialog with itself over the internal bus.

In the example, the response time between the request for activation of an SSPC by discrete input and the actual activation requires about 40 ms. At t=0 ms, it can be seen that there is an activation of one input on the eighth protection card. At t=18.3 ms, there is a reading by the protection card integrating the EDMU functions of the inputs of the eighth protection card. At t=21 ms, there is a calculation of the SSPC commands. At t=39 ms, there is a sending of a command to the eighth protection card. At t=39.3 ms, there is application of the command by the eighth protection card 8.

| | 0 | 0.3 | 3 | 3.3 | 6 | 8.3 | 9 | 9.3 | 12 | 12.3 | 15 | 15.3 | 18 | 18.3 |
|---|---|---|---|---|---|---|---|---|---|---|---|---|---|---|
| SSPC1 EDMU | Cmd SSPC2 | | Cmd SSPC3 | | Cmd SSPC4 | | Cmd SSPC5 | | Cmd SSPC6 | | Cmd SSPC7 | | Cmd SSPC8 | |
| SSPC2 | | Data SSPC2 | | | | | | | | | | | | |
| SSPC3 | | | | Data SSPC3 | | | | | | | | | | |
| SSPC4 | | | | | | Data SSPC4 | | | | | | | | |
| SSPC5 | | | | | | | | Data SSPC5 | | | | | | |
| SSPC6 | | | | | | | | | | Data SSPC6 | | | | |
| SSPC7 | | | | | | | | | | | | Data SSPC7 | | |
| SSPC8 | | | | | | | | | | | | | | Data SSPC8 |

This architecture is viable if the number of protection cards managed by a protection card integrating the EDMU functions is limited. If the protection card integrating the EDMU functions must mange a very large number of protection cards, there is a risk that the performance of the internal bus is inadequate for keeping to an acceptable response time. This time depends on each aircraft manufacturer. The times usually acceptable vary from 50 to 100 ms.

In this case, more protection cards integrating the EDMU functions can be provided. This solution does not increase the total number of cards, but it necessitates redundancy of the aircraft bus interfaces for each cluster of protection cards integrating the EDMU functions connected to an internal bus.

Each cluster of protection cards integrating the EDMU functions is independent, which is an advantage for safety because there is no common point subject to failure.

Provision can also be made for the interface with the aircraft bus of the protection card integrating the EDMU functions to include additional busses, referenced 11a, 11b, 11c, 11d in FIG. 6, making it possible to manage more protection cards.

The distribution system therefore has a unique interface with the aircraft bus and necessitates the use in the aircraft of the additional internal communication busses (CAN). Such a case is shown in FIG. 6.

The invention claimed is:

1. Electrical distribution system for an aircraft comprising at least one electrical supply path comprising at least one power unit capable of opening or closing the connection between at least one electrical energy source and at least one device of the aircraft, characterized in that it comprises
protection cards (2b, 2n) each comprising at least two microcontrollers each capable of sending a command to each power unit of the electrical supply paths protected by each protection card, and
among the set of microcontrollers of the protection cards, at least two microcontrollers are provided with a communication and computation function with all of the microcontrollers of the protection cards (2b, 2n).

2. System according to claim 1, characterized in that the microcontrollers provided with a communication and computation function can be disposed on a same protection card (8),
the microcontrollers provided with a communication and computation function each having an interface with an aircraft bus (3a, 3b).

3. System according to claim 1, characterized in that the microcontrollers provided with a communication and computation function can be disposed on different protection cards (8a, 8b), the microcontrollers provided with a communication and computation function each having an interface with an aircraft bus (3a, 3b).

4. System according to claim 1, characterized in that the microcontrollers provided with a communication and computation function are disposed on at least one protection card each connected to a daughter board comprising the interfaces with the aircraft bus.

5. System according to claim 4, characterized in that it comprises at least two slots capable of receiving a protection card, each slot comprising electrical supplies and data connections allowing the functioning of the inserted protection card, the daughter board being connected and disposed integral with a protection card slot.

6. System according to claim 4, characterized in that the daughter board is connected and disposed in such a way that it is integral with a protection card.

7. System according to claim 1, characterized in that it comprises at least two slots capable of receiving a protection card, each slot comprising electrical supplies and data connections allowing the functioning of the card,
the protection cards comprising microprocessors provided with a communication and computation function are protection cards configured to have the communication and computation function when they are disposed in a predetermined protection card slot.

8. System according to claim 2, characterized in that the microcontrollers provided with a communication and computation function are disposed on a same protection card concentrating all of the information coming from the aircraft bus and from the discrete inputs of all the protection cards of the system, the microcontrollers being capable of calculating all the commands of the power units of the protection cards (2b, 2n) via the internal bus.

9. System according to claim 1, characterized in that the microcontrollers of each protection card receive information coming from the discrete inputs directly connected to each protection card, the microcontrollers being capable of determining and sending the commands of the power units as a function of the information coming from the discrete inputs read.

10. System according to claim 1, characterized in that the microcontrollers of each protection card can receive information coming from the discrete inputs directly connected to each protection card, the microcontrollers being capable either of determining and sending the commands of the power units as a function of the information coming from the discrete inputs read, or of receiving commands calculated by at least one protection card comprising microcontrollers provided with a communication function.

* * * * *